(12) United States Patent
Masumoto et al.

(10) Patent No.: US 9,214,824 B2
(45) Date of Patent: Dec. 15, 2015

(54) CHARGING CONTROL CIRCUIT

(75) Inventors: Hiroshi Masumoto, Yokohama (JP); Shigehito Saigusa, Yokohama (JP)

(73) Assignee: Kabushiki Kaisha Toshiba, Minato-Ku, Tokyo (JP)

( * ) Notice: Subject to any disclaimer, the term of this patent is extended or adjusted under 35 U.S.C. 154(b) by 1050 days.

(21) Appl. No.: 13/053,406

(22) Filed: Mar. 22, 2011

(65) Prior Publication Data

US 2012/0133340 A1     May 31, 2012

(30) Foreign Application Priority Data

Nov. 29, 2010   (JP) ................... 2010-265341

(51) Int. Cl.
*H02J 7/06*   (2006.01)
*H02J 7/24*   (2006.01)
*H02J 7/00*   (2006.01)

(52) U.S. Cl.
CPC ....... *H02J 7/0052* (2013.01); *H02J 2007/0059* (2013.01)

(58) Field of Classification Search
USPC .......................................... 320/140, 143, 164
See application file for complete search history.

(56) References Cited

U.S. PATENT DOCUMENTS

| | | | |
|---|---|---|---|
| 6,144,187 A * | 11/2000 | Bryson ................... | 320/137 |
| 6,414,403 B2 * | 7/2002 | Kitagawa et al. ........... | 307/66 |
| 7,679,343 B2 | 3/2010 | Kokubun et al. | |
| 7,709,976 B2 | 5/2010 | Bazinet | |
| 7,710,079 B2 | 5/2010 | Martin et al. | |
| 7,733,060 B2 | 6/2010 | Kojima | |
| 2007/0018502 A1 | 1/2007 | Bazinet | |
| 2009/0167410 A1 * | 7/2009 | Yoshikawa et al. ........... | 327/427 |

FOREIGN PATENT DOCUMENTS

| | | |
|---|---|---|
| CN | 101228681 A | 7/2008 |
| CN | 201590668 U | 9/2010 |
| JP | 2004282846 A | 10/2004 |

OTHER PUBLICATIONS

Machine translation of JP2004-282846A.*
Translation of CN20092022005, Junpeng et al., Sep. 22, 2010.*
LTC4160/LTC4160-1, Switching Power Manager with USB on-the-go and Overvoltage Protection, Linear Technology Corporation 2009.

(Continued)

*Primary Examiner* — Samuel Berhanu
(74) *Attorney, Agent, or Firm* — White & Case LLP

(57) ABSTRACT

A charging control apparatus controls charging of a battery connected to a battery terminal and supplies a voltage and a current necessary for a system circuit through an output terminal. The charging control apparatus has a switching control circuit that controls a DC-DC converter, the DC-DC converter performing DC-DC conversion with respect to an input voltage input through an input terminal and outputting an obtained output voltage to the output terminal. The charging control apparatus has an output voltage detection circuit that detects the output voltage. The charging control apparatus has a battery voltage detection circuit that detects a battery voltage of the battery terminal. The charging control apparatus has a first switch MOS transistor connected between the output terminal and the battery terminal. The charging control apparatus has a voltage control circuit that controls an operation of the first switch MOS transistor according to the battery voltage.

12 Claims, 8 Drawing Sheets

(56) References Cited

OTHER PUBLICATIONS

Chinese Office Action received in corresponding Chinese Application No. 201110067720.6 dated Dec. 13, 2013, and an English translation thereof.
Chinese Office Action issued on Aug. 8, 2014 in corresponding CN Application No. 20110067720.6 along with English translation thereof.
Chinese Office Action issued on Aug. 8, 2014 in corresponding CN Application No. 201110067720.6 along with English translation thereof.
Chinese Office Action issued on Feb. 11, 2015 in corresponding CN Application No. 201110067720.6 along with English translation thereof.

* cited by examiner

CHARGING CONTROL CIRCUIT

CROSS-REFERENCE TO RELATED APPLICATION

This application is based upon and claims the benefit of priority from the prior Japanese Patent Application No. 2010-265341, filed on Nov. 29, 2010, the entire contents of which are incorporated herein by reference.

BACKGROUND

1. Field

Embodiments described herein relate generally to a charging control circuit and a charging control system.

2. Background Art

A conventional charging control circuit has a configuration in which a battery is directly connected to a system circuit (load). This conventional charging control circuit is problematic in that the system may not start to operate until the battery is charged up to a voltage at which the system load can start to operate.

Furthermore, there is also another type of a conventional charging control device in which a battery and a system circuit (load) are provided with separate controllers (DC-DC converters), respectively. This conventional charging control circuit requires two DC-DC converters. Therefore, this charging control circuit needs to be accompanied by external inductors and capacitors for smoothing twice as many as those of the other type, resulting in a problem of the increase in a mounting area and a cost.

DETAILED DESCRIPTION

A switching power supply apparatus, includes a charging control apparatus according to an embodiment, controls charging of a battery connected to a battery terminal and supplies a voltage and a current necessary for a system circuit through an output terminal. The charging control apparatus has a switching control circuit that controls a DC-DC converter, the DC-DC converter performing DC-DC conversion with respect to an input voltage inputs through an input terminal and outputting an obtained output voltage to the output terminal. The charging control apparatus has an output voltage detection circuit that detects the output voltage. The charging control apparatus has a battery voltage detection circuit that detects a battery voltage of the battery terminal. The charging control apparatus has a first switch MOS transistor connected between the output terminal and the battery terminal. The charging control apparatus has a voltage control circuit that controls an operation of the first switch MOS transistor according to the battery voltage.

Hereafter, embodiments according to the present invention will be described with reference to the drawings.

First Embodiment

Figure 1:
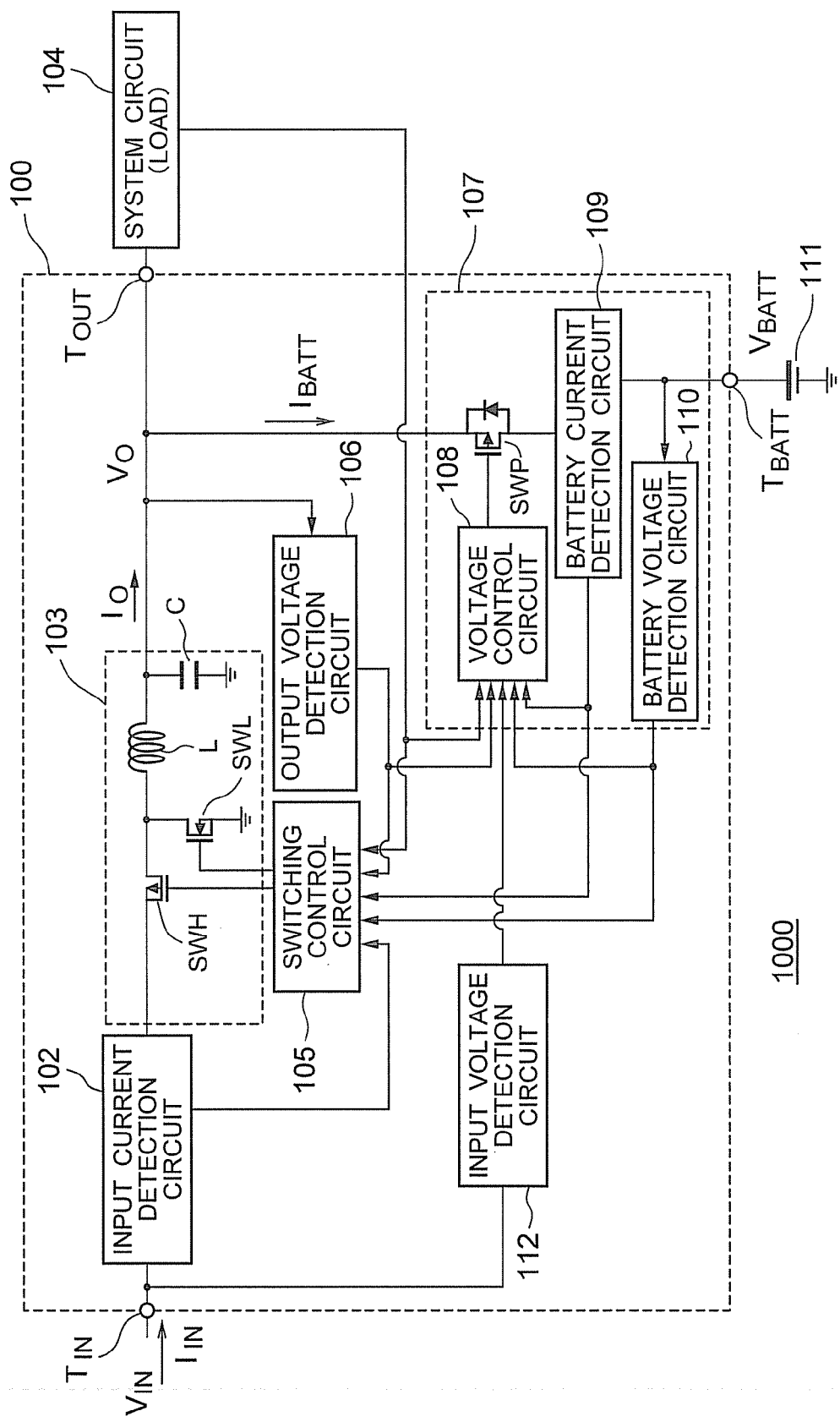
FIG. 1 is a diagram showing an example of the configuration of a charging control system 1000 including a charging control apparatus 100 according to a first embodiment.

FIG. 1 is a diagram showing an example of the configuration of a charging control system 1000 including a charging control apparatus 100 according to a first embodiment.

As shown in FIG. 1, the charging control system 1000 includes the charging control apparatus 100, a system circuit (load) 104, and a battery (a secondary cell) 111.

The charging control apparatus 100 controls charging and discharging of the battery 111 connected to a battery terminal $T_{BATT}$ and to supply a voltage and a current necessary for the system circuit 104 through an output terminal $T_{OUT}$.

The charging control apparatus 100 includes an input current detection circuit 102, a DC-DC converter 103, a switching control circuit 105, an output voltage detection circuit 106, a voltage control circuit 108, a battery current detection circuit 109, a battery voltage detection circuit 110, an input voltage detection circuit 112, and a first switch MOS transistor SWP.

The input current detection circuit 102 detects an input current $I_{IN}$ input to an input terminal $T_{IN}$.

The input voltage detection circuit 112 detects an input voltage $V_{IN}$ input to the input terminal $T_{IN}$.

The output voltage detection circuit 106 detects an output voltage $V_O$.

The battery current detection circuit 109 detects a battery current $I_{BATT}$ flowing between the battery terminal $T_{BATT}$ and the output terminal $T_{OUT}$.

The battery voltage detection circuit 110 detects a battery voltage $V_{BATT}$ at the battery terminal $T_{BATT}$.

The DC-DC converter 103 performs DC-DC conversion with respect to the input voltage $V_{IN}$ (the input current $I_{IN}$) inputs through the input terminal $T_{IN}$, and outputs an obtained output voltage $V_O$ (an output current $I_O$) to the output terminal $T_{OUT}$.

As shown in FIG. 1, the DC-DC converter, for example, includes a low-side MOS transistor SWL, a high-side MOS transistor SWH, an inductor L, and a capacitor C.

The high-side MOS transistor SWH has one end (a source) connected to the input terminal $T_{IN}$ and a gate connected to the switching control circuit 105. The operation of the high-side MOS transistor SWH is controlled by the switching control circuit. In the example of FIG. 1, the high-side MOS transistor SWH is a pMOS transistor. However, if a boosting circuit such as a charge pump circuit is additionally provided for the switching control circuit 105, the high-side MOS transistor SWH may be an nMOS transistor.

The low-side MOS transistor SWL has one end (a source) connected to the other end (a drain) of the high-side MOS transistor SWH and a gate connected to the switching control circuit 105. The operation of the low-side MOS transistor SWL is controlled by the switching control circuit 105. In the example of FIG. 1, the low-side MOS transistor SWL is an nMOS transistor. However, the low-side MOS transistor SWL may be a pMOS transistor.

The inductor L has two ends: one end is connected to the other end (the drain) of the high-side MOS transistor SWH and the other end is connected to the output terminal $T_{OUT}$.

The capacitor C is connected between the other end of the inductor L and the ground.

The inductor L and the capacitor C are used as external parts rather than being mounted in the charging control apparatus 100.

The switching control circuit 105 receives various information including the input voltage $V_{IN}$, the input current $I_{IN}$, the battery voltage $V_{BATT}$, the battery current $I_{BATT}$, the output voltage $V_O$, the starting state of the system circuit, and the like. The switching control circuit 105 controls the DC-DC converter 103, based on the received information, to make the output voltage $V_O$ and the battery current $I_{BATT}$ reach a target value.

The switching control circuit 105, for example, alternately turns on the high-side MOS transistor SWH and the low-side MOS transistor SWL to generate a rectangular wave voltage from the input voltage $V_{IN}$, and smoothes the rectangular wave voltage using the inductor L and the capacitor C to generate the output voltage $V_O$.

The first switch MOS transistor SWP is connected between the output terminal $T_{OUT}$ and the battery terminal $T_{BATT}$. In the example of FIG. 1, the first switch MOS transistor SWP is a pMOS transistor. However, if a boosting circuit such as a charge pump circuit is additionally provided to the voltage control circuit 108, the first switch MOS transistor SWP may be an nMOS transistor.

The voltage control circuit 108 receives various information including the input voltage $V_{IN}$, the input current $I_{IN}$, the battery voltage $V_{BATT}$, the battery current $I_{BATT}$, the output voltage $V_O$, the starting state of the system circuit, and the like. The voltage control circuit 108 controls the operation of the first switch MOS transistor SWP based on the received information.

In addition, the voltage control circuit 108, the battery current detection circuit 109, the battery voltage detection circuit 110, and the first switch MOS transistor SWP constitute a linear control circuit 107.

Next, an example of the operation of the charging control system 1000 having the above configuration will be described.

Figure 2:
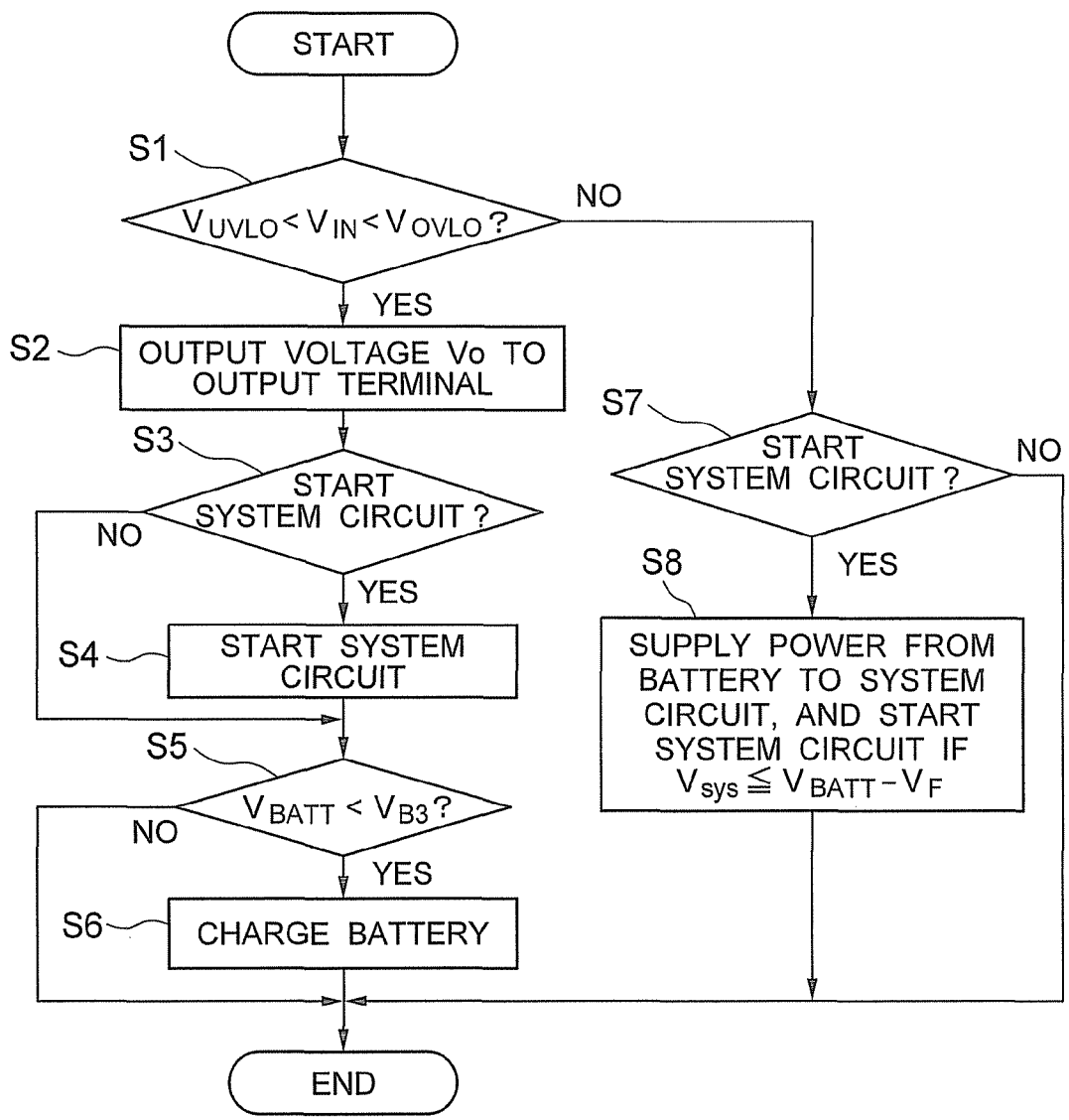
FIG. 2 is a flowchart showing an example of the operation of the charging control system 1000 shown in FIG. 1.

FIG. 2 is a flowchart showing an example of the operation of the charging control system 1000 shown in FIG. 1.

As shown in FIG. 2, in step S1, the charging control system 1000 determines whether the input voltage $V_{IN}$ is in a predetermined range (between a lower limit value $V_{UVLO}$ and the upper limit value $V_{OVLO}$).

In step S2, the charging control system 1000 controls the charging control apparatus 100 to output the output voltage $V_O$ to the output terminal $T_{OUT}$ when the input voltage $V_{IN}$ is in the predetermined range.

Next, in step S3, the charging control system 1000 determines whether a signal for starting a system circuit 104 is input. When it is determined that the signal for starting the system circuit 104 is input, the charging control system 1000 controls the system circuit 104 to start its operation, in step S4. When it is determined that the signal for starting the system circuit 104 is not input, the charging control system 1000 controls the starting the system circuit 104 not to start its operation.

Then, in step S5, the charging control system 1000 determines whether the battery voltage $V_{BATT}$ is higher than a setting voltage $V_{B3}$, which is set to be higher than a system voltage Vsys for driving the system circuit 104. In step S6, the charging control system 1000 charges the battery 111 using the charging control apparatus 100 when it is determined that the battery voltage $V_{BATT}$ is lower than the setting voltage $V_{B3}$. When it is determined that the battery voltage $V_{BATT}$ is higher than the setting voltage $V_{B3}$, the charging control system 1000 does not perform the operation of charging the battery 111 and finishes its control operation.

Meanwhile, when the input voltage $V_{IN}$ is not within the predetermined range, a voltage, which is lower than the battery voltage $V_{BATT}$ by a forward voltage $V_F$ of a parasitic diode formed at a terminal (a drain) of the first switch MOS transistor SWP connected to the system 104, is output from a terminal (a source) of the first switch MOS transistor SWP connected to the battery 111 as $V_O$ by the parasitic diode. Thus, it is determined that the signal for starting the system circuit 104 is input in step S7. At this time, when the voltage lower than the battery voltage $V_{BATT}$ by the forward voltage $V_F$ of the parasitic diode is sufficient for starting the system circuit 104, the system circuit 104 is started in step S8. In addition, in the case where the first switch MOS transistor SWP is embedded, the forward voltage of the parasitic diode has a value of about 0.6 V to about 0.7 V.

Figure 3:
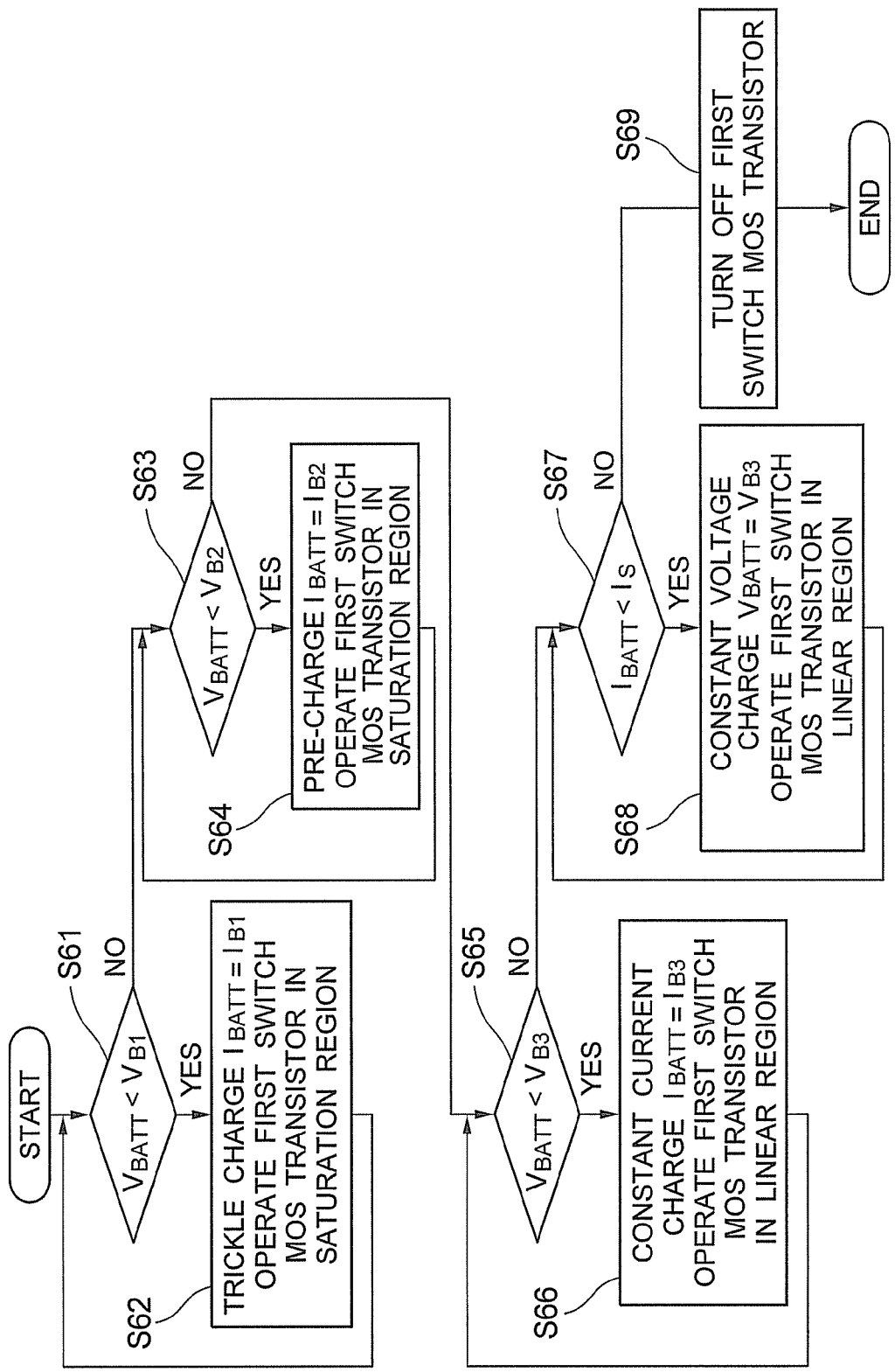
FIG. 3 is a flowchart showing an example of the charging operation of the charging control apparatus 100 when charging the battery 111 in step S6 shown in FIG. 2.
Figure 4:
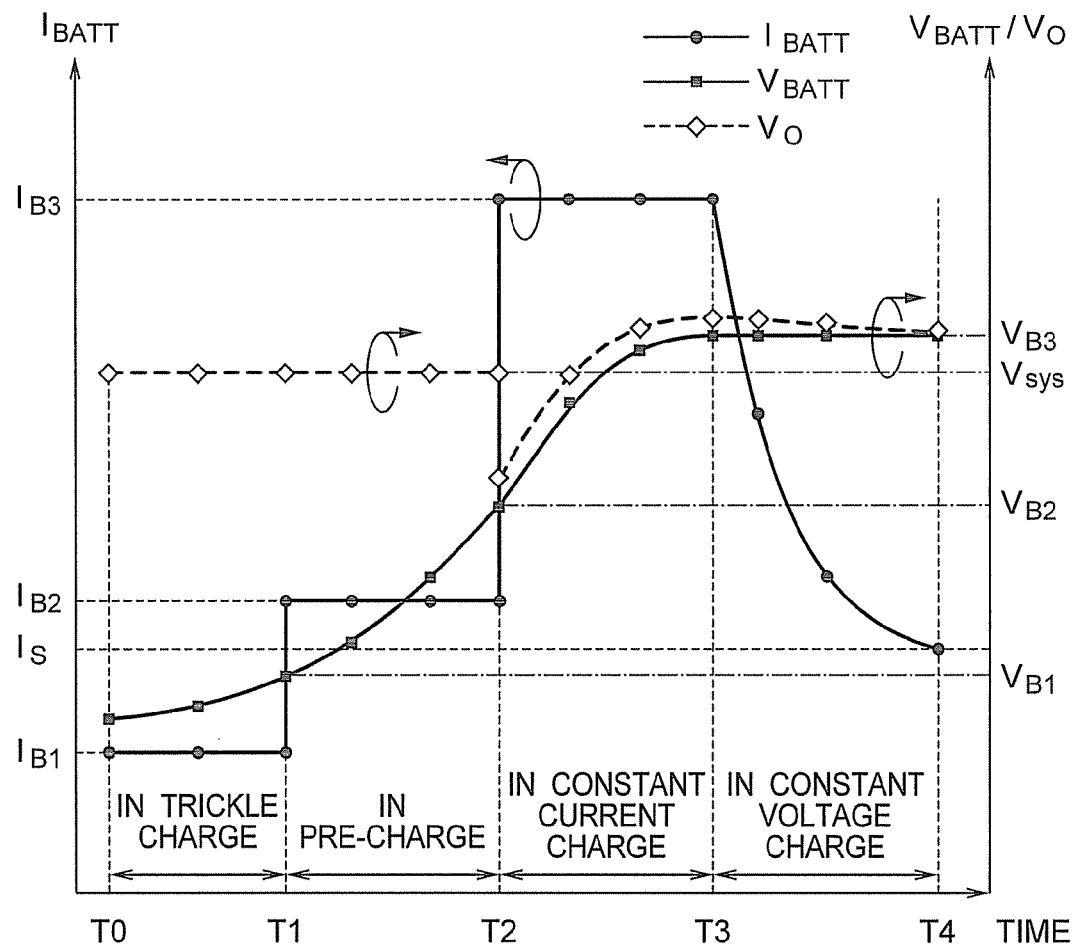
FIG. 4 is a diagram showing an example of current-voltage characteristics of the charging control apparatus 100 shown in FIG. 1 when charging the battery 111.

FIG. 3 is a flowchart showing an example of the charging operation of the charging control apparatus 100 when charging the battery 111 in step S6 shown in FIG. 2. FIG. 4 is a diagram that shows an example of current-voltage characteristics of the charging control apparatus 100 shown in FIG. 1 while charging the battery 111.

In FIGS. 3 and 4, a setting current $I_{B1}$ is randomly set and may be, for example, a value of the battery current $I_{BATT}$ at the time of trickle charge. A setting current $I_{B2}$ is set to be larger than the setting current $I_{B1}$ and may be, for example, a value of the battery current $I_{BATT}$ at the time of precharge. A setting current $I_{B3}$ is set to be larger than the setting current $I_{B2}$ and may be, for example, a value of the battery current $I_{BATT}$ at the time of constant current charge. A stop current $I_S$ is set in advance, and may be a value of the battery current $I_{BATT}$ serving as a reference for stopping the charging of the battery 111.

Furthermore, a setting voltage $V_{B1}$ is a value of the battery voltage $V_{BATT}$ serving as a reference for switching the trickle charge and the pre-charge. A setting voltage $V_{B2}$ is set to be higher than the setting voltage $V_{B1}$ and may be a value of the battery voltage $V_{BATT}$ serving as a reference for switching the pre-charge and the constant current charge. A setting voltage $V_{B3}$ is set to be higher than the setting voltage $V_{B2}$ and may be the value of the battery current $I_{BATT}$ serving as a target charge voltage.

As shown in FIG. 3, when charging the battery 111, the charging control apparatus 100 (the switching control circuit 105 and the voltage control circuit 108) determines whether the battery voltage $V_{BATT}$ is smaller than the setting voltage $V_{B1}$, in step S61.

When the battery voltage $V_{BATT}$ is smaller than the setting voltage $V_{B1}$, the switching control circuit 105 controls the DC-DC converter 103 such that the voltage of the output terminal $T_{OUT}$ becomes $V_O$. The voltage control circuit 108 makes the first switch MOS transistor SWP operate in a saturation region such that the battery current $I_{BATT}$ becomes the setting current $I_{B1}$, in step S62. Thus, the battery 111 is charged with the setting current $I_{B1}$.

Steps S61 and S62 are repeated until the battery voltage $V_{BATT}$ is equal to or more than the setting voltage $V_{B1}$ (time period between T0 and T1 of FIG. 4).

Next, if the battery voltage $V_{BATT}$ is equal to or more than the setting voltage $V_{B1}$, the charging control apparatus 100 (the switching control circuit 105 and the voltage control circuit 108) determines whether the battery voltage $V_{BATT}$ is smaller than the setting voltage $V_{B2}$, in step S63.

When the battery voltage $V_{BATT}$ is smaller than the setting voltage $V_{B2}$, the switching control circuit 105 controls the DC-DC converter 103 such that the voltage of the output terminal $T_{OUT}$ becomes $V_O$. The voltage control circuit 108 makes the first switch MOS transistor SWP operate in the saturation region such that the battery current $I_{BATT}$ becomes the setting current $I_{B2}$, in step S64. Thus, the battery 111 is charged with the setting current $I_{B2}$.

Steps S63 and S64 are repeated until the battery voltage $V_{BATT}$ is equal to or more than the setting voltage $V_{B2}$ (time period between T1 and T2 of FIG. 4).

Then, when the battery voltage $V_{BATT}$ is equal to or more than the setting voltage $V_{B2}$, the charging control apparatus 100 (the switching control circuit 105 and the voltage control circuit 108) determines whether the battery voltage $V_{BATT}$ is smaller than the setting voltage $V_{B3}$, in step S65.

When the battery voltage $V_{BATT}$ is equal to or more than the setting voltage $V_{B2}$ and is smaller than the setting voltage $V_{B3}$, the voltage control circuit 108 makes the first switch MOS transistor SWP operate in a linear region, and the switching control circuit 105 controls the DC-DC converter 103 such that the battery current $I_{BATT}$ becomes the setting current $I_{B3}$, in step S66. Thus, the battery 111 is charged with the setting current $I_{B3}$.

Steps S65 and S66 are repeated until the battery voltage $V_{BATT}$ is equal to or more than the setting voltage $V_{B3}$ (time period between T2 and T3 of FIG. 4).

Then, if the battery voltage $V_{BATT}$ is equal to or more than the setting voltage $V_{B3}$, the charging control apparatus 100 (the switching control circuit 105 and the voltage control circuit 108) determines whether the battery current $I_{BATT}$ exceeds the stop current $I_S$, in step S67.

When the battery voltage $V_{BATT}$ is equal to or more than the setting voltage $V_{B3}$ and the battery current $I_{BATT}$ exceeds the stop current $I_S$, the voltage control circuit 108 makes the first switch MOS transistor SWP operate in the linear region, and the switching control circuit 105 controls the DC-DC converter 103 such that the battery voltage $V_{BATT}$ becomes the setting voltage $V_{B3}$, in step S68.

Steps S67 and S68 are repeated until the battery current $I_{BATT}$ is equal to or less than the stop current $I_S$ (time period between T3 and T4 of FIG. 4).

When the battery current $I_{BATT}$ is equal to or less than the stop current $I_S$, the voltage control circuit 108 turns off the first switch MOS transistor SWP to stop the charging of the battery 111. Thus, the battery 111 is charged with the setting voltage $V_{B3}$.

As described above, even when the battery voltage $V_{BATT}$ is smaller than a voltage necessary for starting the system circuit 104, the charging control system 1000 can start the system circuit 104, and the battery 111 also can be charged to a predetermined voltage.

Furthermore, in the conventional charging control apparatus using a linear charger, for example, in a case where an input voltage is 5 V, a battery voltage is 3 V, and a battery current is 1 A; a loss of 2 W occurs while charging a battery.

However, when charging a battery using the charging control apparatus 100 according to the first embodiment, the first switch MOS transistor SWP is allowed to operate in the linear region. Therefore, a resistance value thereof is low as compared with the case where the first switch MOS transistor SWP operates in the saturation region, and loss is reduced to 0.44 W (efficiency of 90%) under the same conditions.

That is, heat loss in the first switch MOS transistor SWP can be prevented and current consumption of the charging control apparatus 100 can be reduced.

In addition, as mentioned herein, since the charging control apparatus 100 includes only one DC-DC converter 103 (a set of an inductor and a capacitor for smoothing), a mounting area and a cost do not increase.

As described above, in the charging control apparatus according to the first embodiment, power consumption can be reduced.

Second Embodiment

In the second embodiment, an example of a configuration for reducing power consumption when power is supplied from a battery to a system circuit will be described.

Figure 5:
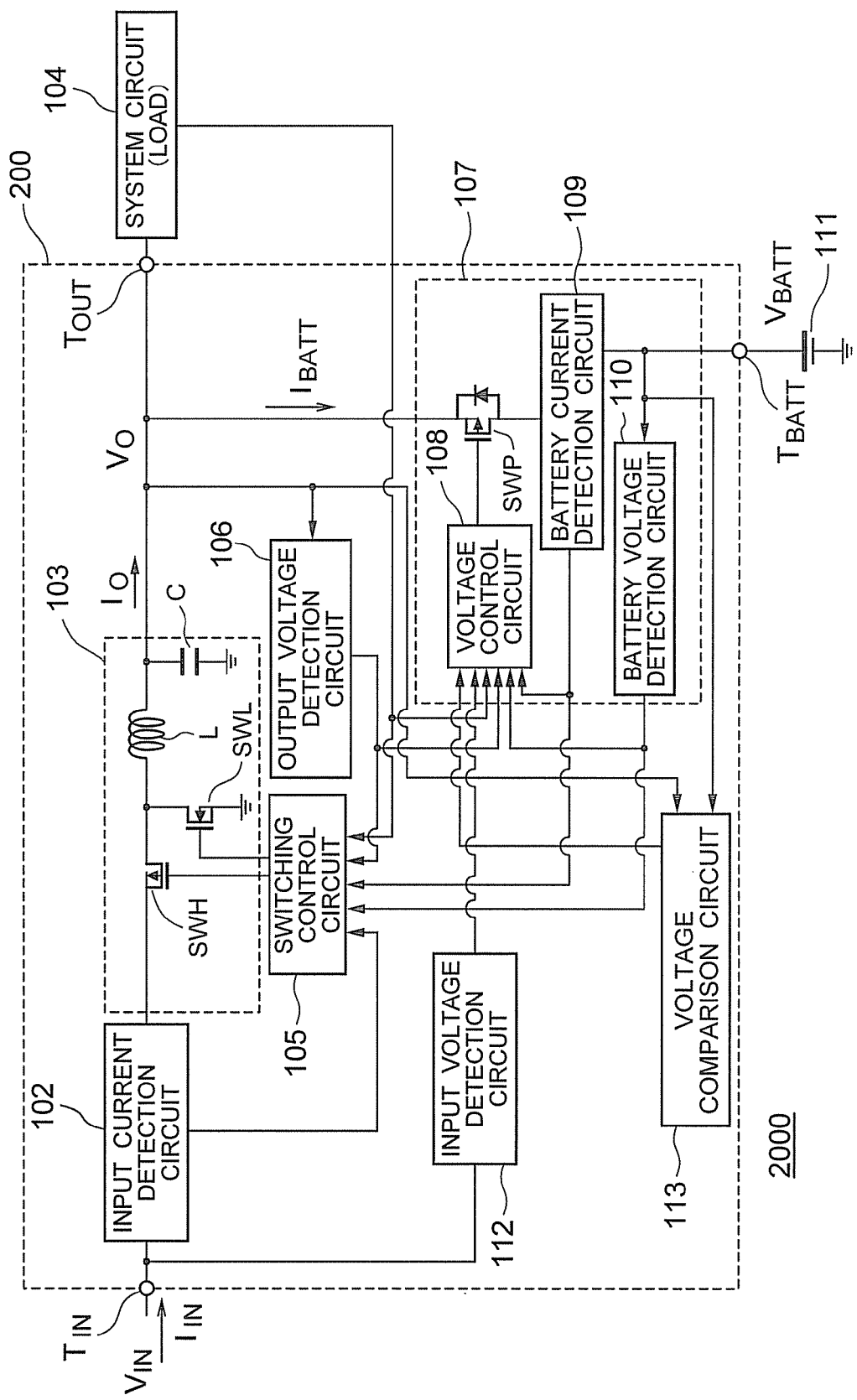
FIG. 5 is a diagram showing an example of the configuration of a charging control system 2000 including a charging control apparatus 200 according to a second embodiment.

FIG. 5 is a diagram showing an example of the configuration of a charging control system 2000 including a charging control apparatus 200 according to a second embodiment. In FIG. 5, the same reference numerals as those of FIG. 1 refer to the same configurations as those of the first embodiment.

As shown in FIG. 5, the charging control system 2000 includes the charging control apparatus 200, a system circuit (load) 104, and a battery (a secondary cell) 111. The charging control system 2000 is substantially identical to the charging control system 1000 according to the first embodiment, except for the configuration of the charging control apparatus 200.

The charging control apparatus 200 controls the charging and discharging of a battery 111 connected to a battery terminal $T_{BATT}$ and to supply a voltage and a current necessary for the system circuit 104 through an output terminal $T_{OUT}$.

The charging control apparatus 200 includes an input current detection circuit 102, a DC-DC converter 103, a switching control circuit 105, an output voltage detection circuit 106, a voltage control circuit 108, a battery current detection circuit 109, a battery voltage detection circuit 110, an input voltage detection circuit 112, a voltage comparison circuit 113, and a first switch MOS transistor SWP.

The configuration and function of the charging control apparatus 200 are substantially identical to the charging control apparatus 100 according to the first embodiment, except for the voltage comparison circuit 113.

The voltage comparison circuit 113 compares an output voltage $V_O$ with a battery voltage $V_{BATT}$ and output the comparison result to the voltage control circuit 108.

Next, an example of the operation of the charging control system 2000 having the above configuration will be described.

Figure 6:
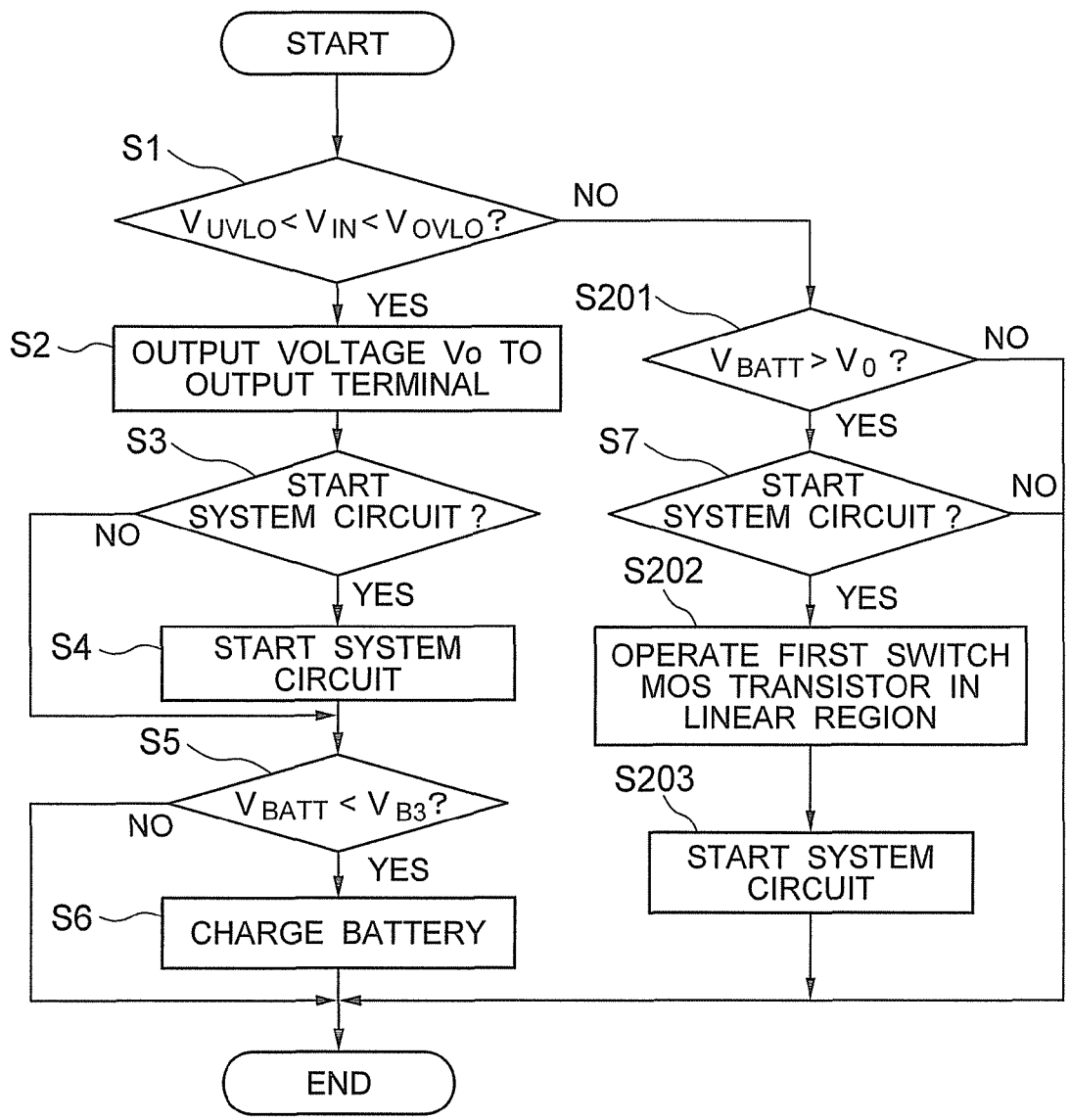
FIG. 6 is a flowchart showing the example of the operation of the charging control system 2000 shown in FIG. 5.

FIG. 6 is a flowchart showing the example of the operation of the charging control system 2000 shown in FIG. 5. In FIG. 6, the same reference numerals as those of FIG. 2 refer to the same processes as those of the first embodiment. Specifically, the process of a charging operation of the charging control apparatus 200 in step S6 shown in FIG. 6 is substantially identical to the process shown in FIG. 3 according to the first embodiment.

As shown in FIG. 6, when it is determined that an input voltage $V_{IN}$ is in a predetermined range (between the lower limit value $V_{UVLO}$ and the upper limit value $V_{OVLO}$), in step S1, the charging control system 2000 controls the charging control apparatus 200 to output an output voltage $V_O$ to an output terminal $T_{OUT}$, in step S2, and determines whether a signal for starting the system circuit 104 is input, in step S3.

When it is determined that the signal for starting the system circuit 104 is input, the charging control system 2000 starts the system circuit 104, in step S4. When it is determined that the signal for starting the system circuit 104 is not input, the charging control system 2000 does not start the system circuit 104.

Then, the charging control system 2000 determines whether the battery voltage $V_{BATT}$ is higher than a setting voltage $V_{B3}$, which is set to be higher than a system voltage Vsys for driving the system circuit 104, in step S5. When it is determined that the battery voltage $V_{BATT}$ is lower than the setting voltage $V_{B3}$, the charging control system 2000 charges the battery 111 using the charging control apparatus 200, in step S6. When it is determined that the battery voltage $V_{BATT}$ is higher than the setting voltage $V_{B3}$, the charging control system 2000 does not perform an operation of charging the battery 111 but finishes the control operation.

Meanwhile, when the input voltage $V_{IN}$ is not within the predetermined range, the charging control system 2000 determines whether the battery voltage $V_{BATT}$ is higher than the output voltage $V_O$, in step S201. When the battery voltage $V_{BATT}$ is higher than the output voltage $V_O$, the charging control system 2000 determines whether the signal for starting the system circuit 104 is input, in step S7. When it is determined that the signal for starting the system circuit 104 is input, if the voltage surprised from the battery 111 is higher than the voltage to operate the he system circuit 104, voltage control circuit 108 makes the first switch MOS transistor SWP operate in a linear region, in step S202, and supplies power from the battery 111 to the system circuit 104 through the first switch MOS transistor SWP to start the system circuit 104, in step S203. When the battery voltage $V_{BATT}$ is lower than the output voltage $V_O$, the charging control system 2000 does not perform an operation of starting the system circuit 104 but finishes its control operation.

As described above, when power is supplied from the battery 111 to the system circuit 104, the first switch MOS transistor SWP is allowed to operate in the linear region, so that heat loss in the first switch MOS transistor SWP can be prevented, current consumption of the charging control apparatus 200 can be reduced, and the lifespan of the battery 111 can be prolonged, as compared with the case of supplying power using a parasitic diode of the first switch MOS transistor SWP.

In addition, similar to the first embodiment, since the charging control apparatus 200 includes only one DC-DC converter 103 (a set of an inductor and a capacitor for smoothing), a mounting area and a cost do not increase.

As described above, in the charging control apparatus according to the second embodiment, power consumption can be reduced, similar to the first embodiment.

Third Embodiment

In the third embodiment, an example of a configuration for reducing power consumption when power is supplied from a battery to a system circuit will be described.

Figure 7:
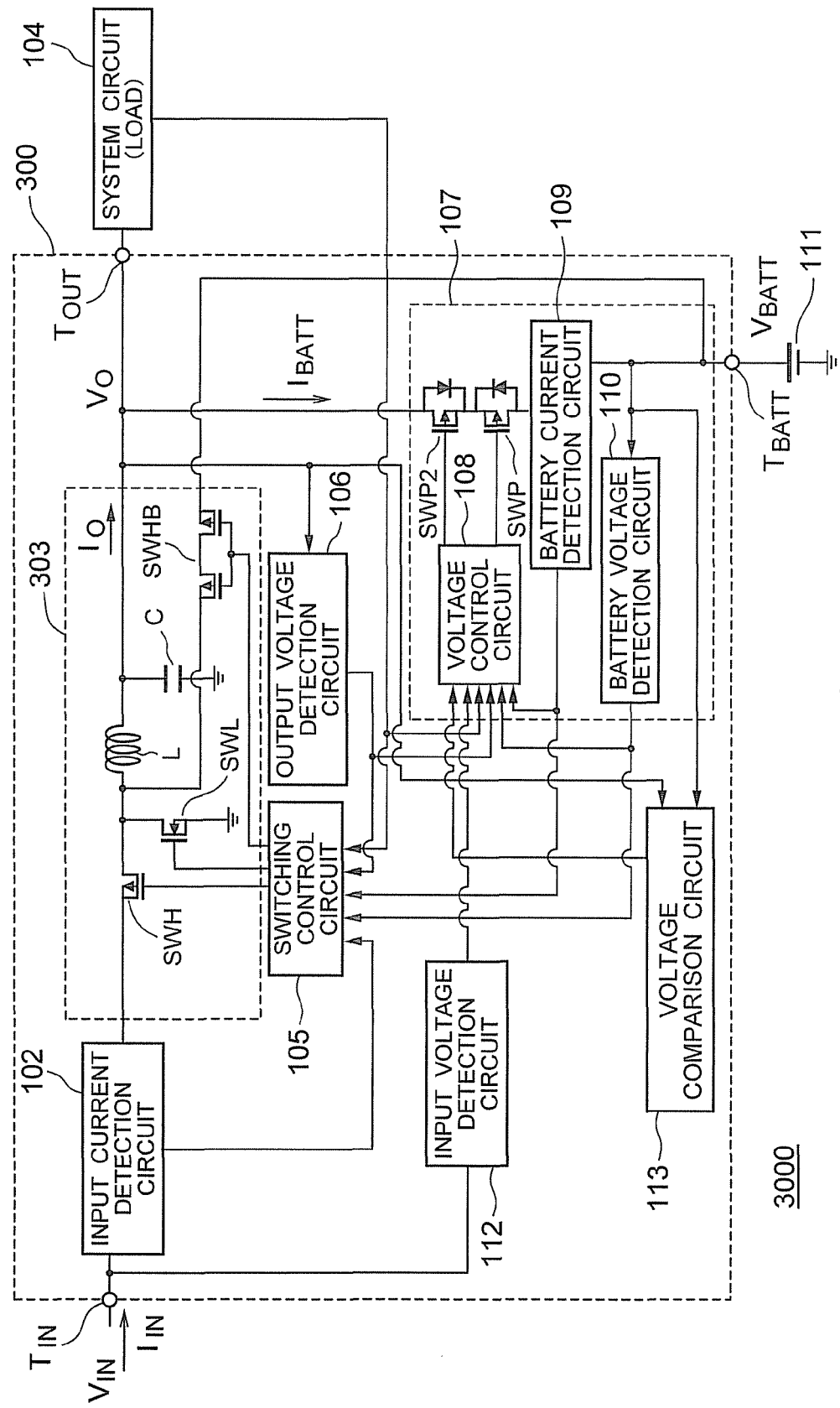
FIG. 7 is a diagram showing an example of the configuration of a charging control system 3000 including a charging control apparatus 300 according to the third embodiment.

FIG. 7 is a diagram showing an example of the configuration of a charging control system 3000 including a charging control apparatus 300 according to the third embodiment. In FIG. 7, the same reference numerals as those of FIG. 5 refer to the same configurations as those of the second embodiment.

As shown in FIG. 7, the charging control system 3000 includes the charging control apparatus 300, a system circuit (load) 104, and a battery (a secondary cell) 111. The charging control system 3000 is substantially identical to the charging control system 2000 according to the second embodiment, except for the configuration of the charging control apparatus 300.

The charging control apparatus 300 controls the charging and discharging of a battery 111 connected to a battery terminal $T_{BATT}$ and to supply a voltage and a current necessary for the system circuit 104 through an output terminal $T_{OUT}$.

The charging control apparatus 300 includes an input current detection circuit 102, a DC-DC converter 303, a switching control circuit 105, an output voltage detection circuit 106, a voltage control circuit 108, a battery current detection circuit 109, a battery voltage detection circuit 110, an input voltage detection circuit 112, a voltage comparison circuit 113, a first switch MOS transistor SWP, and a second switch MOS transistor SWP2. The configuration and function of the charging control apparatus 300 are substantially identical to those of the charging control apparatus 200 according to the second embodiment, except for the DC-DC converter 303 and the second switch MOS transistor SWP2.

The DC-DC converter 303 is configured to perform DC-DC conversion with respect to an input voltage $V_{IN}$ (an input current $I_{IN}$) input through an input terminal $T_{IN}$, and to output an obtained output voltage $V_O$ (an output current $I_O$) to an output terminal $T_{OUT}$.

The DC-DC converter 303, for example, includes a low-side MOS transistor SWL, a high-side MOS transistor SWH, an inductor L, a capacitor C, and a second high-side MOS transistor SWHB. That is, as compared with the DC-DC converter 103 according to the second embodiment, the DC-DC converter 303 further includes the second high-side MOS transistor SWHB.

The second high-side MOS transistor SWHB is connected between one end (a drain of the high-side MOS transistor SWH) of the inductor L and a battery terminal $T_{BATT}$, and has a gate connected to the switching control circuit 105. The operation of the second high-side MOS transistor SWHB is controlled by the switching control circuit.

The switching control circuit 105, for example, alternately turns on the second high-side MOS transistor SWHB and the low-side MOS transistor SWL in the state where the high-side MOS transistor SWH is turned off, in order to generate a rectangular wave voltage from a battery voltage $V_{BATT}$. The switching control circuit 105, then, smoothes the rectangular wave voltage using the inductor L and the capacitor C in order to generate the output voltage $V_O$.

Next, the second switch MOS transistor SWP2 has one end (a drain) connected to the output terminal $T_{OUT}$, the other end (a source) connected to a terminal (a source) of the first switch MOS transistor SWP, and a control terminal (a gate) connected to the voltage control circuit 108. The second switch MOS transistor SWP2 is controlled by the voltage control circuit 108 and the voltage comparison circuit 113 such that the second switch MOS transistor SWP2 is always in ON state except for the case where power is supplied from the battery 111 to the system circuit 104.

Next, an example of the operation of the charging control system 3000 having the above configuration will be described.

Figure 8:
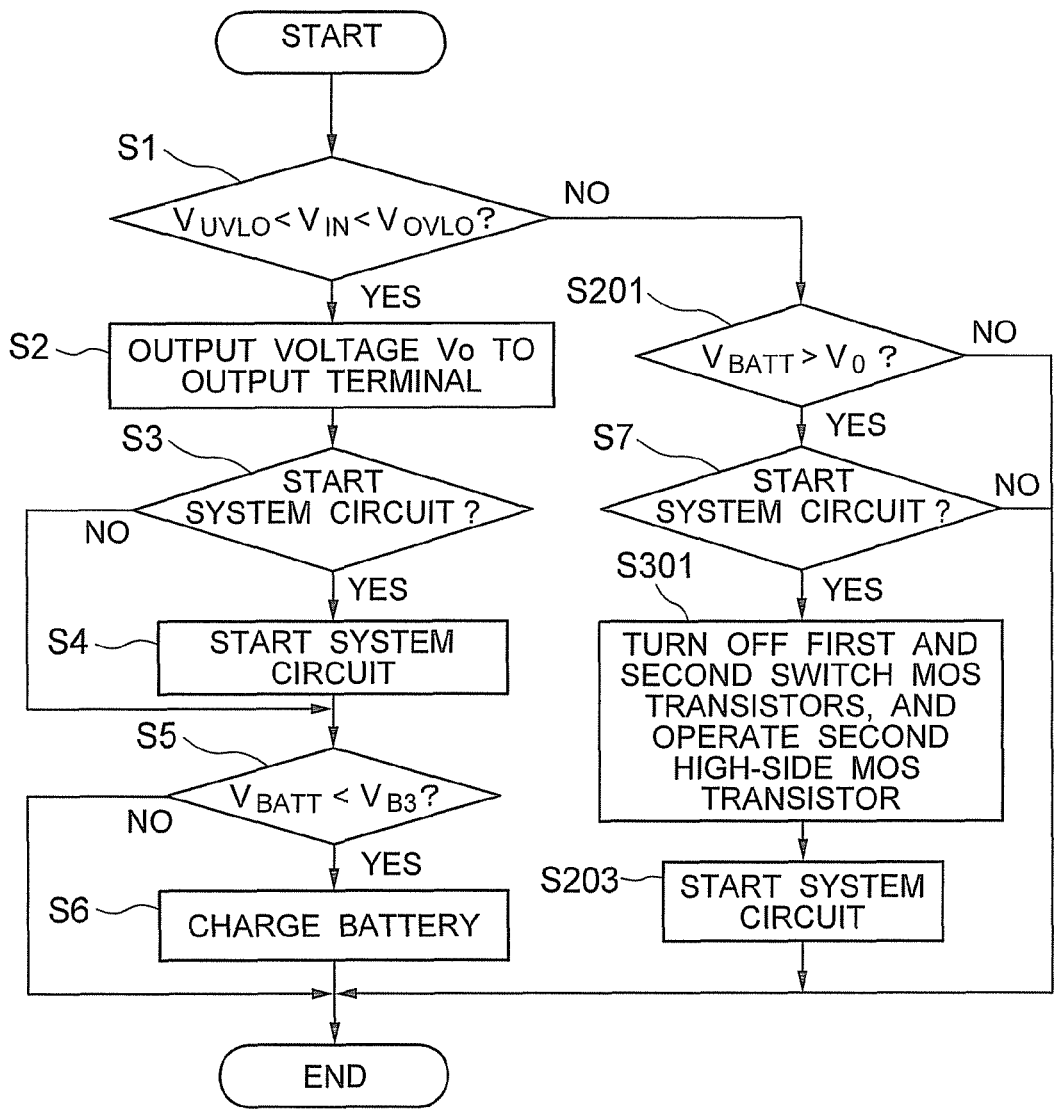
FIG. 8 is a flowchart showing an example of the operation of the charging control system 3000 shown in FIG. 7.

FIG. 8 is a flowchart showing an example of the operation of the charging control system 3000 shown in FIG. 7. The process of a charging operation of the charging control apparatus 300 in step S6 shown in FIG. 8 is substantially identical to the process shown in FIG. 3 according to the first embodiment.

As shown in FIG. 8, when it is determined that an input voltage $V_{IN}$ is within a predetermined range (between the lower limit value $V_{UVLO}$ and the upper limit value $V_{OVLO}$), in step S1, the charging control system 3000 controls the charging control apparatus 300 to output an output voltage $V_O$ to an output terminal $T_{OUT}$, in step S2, and determines whether a signal for starting the system circuit 104 is input, in step S3.

When it is determined that the signal for starting the system circuit 104 is input, the charging control system 3000 starts the system circuit 104, in step S4. When it is determined that the signal for starting the system circuit 104 is not input, the charging control system 3000 does not start the system circuit 104.

Then, the charging control system 3000 determines whether the battery voltage $V_{BATT}$ is higher than a setting voltage $V_{B3}$, which is set to be higher than a system voltage Vsys for driving the system circuit 104, in step S5. When it is determined that the battery voltage $V_{BATT}$ is lower than the setting voltage $V_{B3}$, the charging control system 3000 charges the battery 111 using the charging control apparatus 300, in step S6. When it is determined that the battery voltage $V_{BATT}$ is higher than the setting voltage $V_{B3}$, the charging control system 3000 does not perform an operation of charging the battery 111 but finishes its control operation.

Meanwhile, when the input voltage $V_{IN}$ is not within the predetermined range, the charging control system 3000 determines whether the battery voltage $V_{BATT}$ is higher than the output voltage $V_O$, in step S7. When the battery voltage $V_{BATT}$ is higher than the output voltage $V_O$, the charging control system 3000 determines whether the signal for starting the system circuit 104 is input, in step S8. When it is determined that the signal for starting the system circuit 104 is input, if the voltage surprised from the battery 111 is higher than the voltage to operate the he system circuit 104, the voltage control circuit 108 and the switching control circuit 105 turn off the second switch MOS transistor SWP2 and the high-side MOS transistor SWH, and control the low-side MOS transistor SWL and the second high-side MOS transistor SWHB, in step S301. The voltage control circuit 108 and the switching control circuit 105, then, supply power from the battery 111 to the system circuit 104 through the second high-side MOS transistor SWHB to start the system circuit 104. When the battery voltage $V_{BATT}$ is lower than the output voltage $V_O$, the charging control system 3000 does not perform an operation of starting the system circuit 104 but finishes its control operation.

As described above, when power is supplied from the battery 111 to the system circuit 104, the inductor L, the capacitor C, the low-side MOS transistor SWL, and the second high-side MOS transistor SWHB operate as the DC-DC converter. Therefore, in the case where the output voltage $V_O$ necessary for starting the system circuit 104 is lower than the battery voltage $V_{BATT}$, power consumption of the system circuit 104 can be reduced and the lifespan of the battery 111 can be prolonged, as compared with the case where power is supplied from the battery 111 to the system circuit 104 through the first switch MOS transistor operating in the saturation region.

In addition, similar to the second embodiment, since the DC-DC converter 303 in the charging control apparatus 300 requires only a set of an inductor and a capacitor for smoothing as external parts, a mounting area and a cost do not increase.

As described above, in the charging control apparatus according to the third embodiment, power consumption can be reduced, similar to the first embodiment.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A charging control apparatus that controls charging of a battery connected to a battery terminal and supplies a voltage and a current necessary for a system circuit through an output terminal, the charging control apparatus comprises:
    a switching control circuit that controls a DC-DC converter, the DC-DC converter performing DC-DC conversion with respect to an input voltage inputs through an input terminal and outputting an obtained output voltage to the output terminal;
    an output voltage detection circuit that detects the output voltage;
    a battery voltage detection circuit that detects a battery voltage of the battery terminal;
    a first switch MOS transistor connected to the output terminal at a first end thereof;
    a voltage control circuit that controls an operation of the first switch MOS transistor according to the battery voltage; and
    a battery current detection circuit connected between a second end of the first switch MOS transistor and the battery terminal, detecting a battery current flowing between the battery terminal and the output terminal,
    wherein, when charging the battery,
    if the battery voltage is smaller than a first setting voltage, the voltage control circuit makes the first switch MOS transistor operate in a saturation region such that the battery current becomes a first setting current and the switching control circuit controls the DC-CD converter such that the output voltage becomes a third setting voltage;
    if the battery voltage is equal to or more than the first setting voltage and is smaller than a second setting voltage that is higher than the first setting voltage, the voltage control circuit makes the first switch MOS transistor operate in the saturation region and the switching control circuit controls the DC-DC converter such that the battery current becomes a second setting current that is larger than the first setting current;
    if the battery voltage is equal to or more than the second setting voltage, the voltage control circuit makes the first switch MOS transistor operate in a liner region and the switching control circuit controls the DC-DC converter such that the battery voltage becomes the second setting voltage; and
    if the battery current is equal to or less than a preset stop current, the voltage control circuit turns off the first switch MOS transistor to stop charging the battery.

2. The charging control apparatus according to claim 1, further comprising a voltage comparison circuit that compares the output voltage with the battery voltage and output a comparison result to the voltage control circuit.

3. The charging control apparatus according to claim 2, wherein, when the output voltage is lower than the battery voltage, the voltage control circuit makes the first switch MOS transistor operate in a linear region to supply power from the battery to the system circuit through the first switch MOS transistor.

4. The charging control apparatus according to claim 2, wherein the DC-DC converter comprises:
- a first high-side MOS transistor that has a first end connected to the input terminal, an operation of the first high-side MOS transistor being controlled by the switching control circuit;
- a low-side MOS transistor that has a first end connected to a second end of the first high-side MOS transistor, an operation of the low-side MOS transistor being controlled by the switching control circuit;
- an inductor that has a first end connected to the second end of the first high-side MOS transistor, and has a second end connected to the output terminal;
- a capacitor connected between the second end of the inductor and a ground; and
- a second high-side MOS transistor connected between the first end of the inductor and the battery terminal, an operation of the second high-side MOS transistor being controlled by the switching control circuit,
- wherein, when the output voltage is lower than the battery voltage, the switching control circuit turns off the first high-side MOS transistor, and controls the low-side MOS transistor and the second high-side MOS transistor to supply power from the battery to the system circuit through the second high-side MOS transistor.

5. The charging control apparatus according to claim 4, further comprising a second switch MOS transistor connected between the second end of the inductor and the first end of the first switch MOS transistor,
- wherein, when the output voltage is lower than the battery voltage, the voltage control circuit turns off the second switch MOS transistor.

6. A charging control system comprising:
- a battery;
- a system circuit; and
- a charging control apparatus that controls charging of the battery connected to a battery terminal and supplies a voltage and a current necessary for the system circuit through an output terminal,
- wherein the charging control apparatus comprises:
  - a DC-DC converter that performs DC-DC conversion with respect to an input voltage inputs through an input terminal, and outputs an obtained output voltage to the output terminal;
  - a switching control circuit that controls the DC-DC converter;
  - an output voltage detection circuit that detects the output voltage;
  - a battery voltage detection circuit that detects a battery voltage of the battery terminal;
  - a first switch MOS transistor connected to the output terminal at a first end thereof; and
  - a voltage control circuit that controls an operation of the first switch MOS transistor according to the battery voltage,
- wherein the charging control apparatus comprises a battery current detection circuit connected between a second end of the first switch MOS transistor and the battery terminal, detecting a battery current flowing between the battery terminal and the output terminal,
- wherein, when charging the battery,
  - if the battery voltage is smaller than a first setting voltage, the voltage control circuit makes the first switch MOS transistor operate in a saturation region such that the battery current becomes a first setting current and the switching control circuit controls the DC-DC converter such that the output voltage becomes a third setting voltage;
  - if the battery voltage is equal to or more than the first setting voltage and is smaller than a second setting voltage higher than the first setting voltage, the voltage control circuit makes the first switch MOS transistor operate in the saturation region and the switching control circuit controls the DC-DC converter such that the battery current becomes a second setting current, the second setting current being larger than the first setting current;
  - if the battery voltage is equal to or more than the second setting voltage, the voltage control circuit makes the first switch MOS transistor operate in a liner region and the switching control circuit controls the DC-DC converter such that the battery voltage becomes the second setting voltage; and
  - if the battery current is equal to or less than a preset stop current, the voltage control circuit turns off the first switch MOS transistor to stop charging the battery.

7. The charging control system according to claim 6, wherein the charging control apparatus comprises:
- a voltage comparison circuit that that compares the output voltage with the battery voltage and outputs a comparison result to the voltage control circuit, and
- wherein, when the output voltage is lower than the battery voltage, the voltage control circuit controls makes the first switch MOS transistor operate in a linear region to supply power from the battery to the system circuit through the first switch MOS transistor.

8. The charging control system according to claim 6, wherein the charging control apparatus comprises:
- a voltage comparison circuit that compares the output voltage with the battery voltage and outputs a comparison result to the voltage control circuit, and
- wherein the DC-CD converter comprises:
  - a first high-side MOS transistor that has a first end connected to the input terminal and operates under a control of the switching control circuit;
  - a low-side MOS transistor having a first end connected to a second end of the first high-side MOS transistor and operates under the control of the switching control circuit;
  - an inductor having a first end connected to the second end of the first high-side MOS transistor and having a second end connected to the output terminal;
  - a capacitor connected between the second end of the inductor and a ground; and
  - a second high-side MOS transistor connected between the first end of the inductor and the battery terminal, and operating under the control of the switching control circuit,
- wherein, when the output voltage is lower than the battery voltage, the switching control circuit turns off the first high-side MOS transistor, and controls the low-side MOS transistor and the second high-side MOS transistor such that power is supplied from the battery to the system circuit through the second high-side MOS transistor.

9. The charging control system according to claim 8, wherein the charging control apparatus comprises:
- a second switch MOS transistor connected between the second end of the inductor and the first end of the first switch MOS transistor, and
- wherein, when the output voltage is lower than the battery voltage, the voltage control circuit turns off the second switch MOS transistor.

10. A charging control apparatus that controls charging of a battery connected to a battery terminal and supplies a voltage and a current necessary for a system circuit through an output terminal, a capacitor being able to be connected between the output terminal and a ground, the charging control apparatus comprises:
- a first high-side MOS transistor that has a first end connected to an input terminal and a second end connected to a first end of an inductor;
- a low-side MOS transistor having a first end connected to a second end of the first high-side MOS transistor;
- a first switch MOS transistor connected to the output terminal at a first end thereof;
- a switching control circuit that controls the first high-side MOS transistor and the low-side MOS transistor;
- an output voltage detection circuit that detects the output voltage;
- a battery voltage detection circuit that detects a battery voltage of the battery terminal; and
- a voltage control circuit that controls an operation of the first switch MOS transistor according to the battery voltage; and
- a battery current detection circuit connected between a second end of the first switch MOS transistor and the battery terminal, detecting a battery current flowing between the battery terminal and the output terminal,
- wherein, when charging the battery,
- if the battery voltage is smaller than a first setting voltage, the voltage control circuit makes the first switch MOS transistor operate in a saturation region such that the battery current becomes a first setting current and the switching control circuit controls the first high-side MOS transistor and the low-side MOS transistor such that the output voltage becomes a third setting voltage;
- if the battery voltage is equal to or more than the first setting voltage and is smaller than a second setting voltage that is higher than the first setting voltage, the voltage control circuit makes the first switch MOS transistor operate in the saturation region and the switching control circuit controls the first high-side MOS transistor and the low-side MOS transistor such that the battery current becomes a second setting current that is larger than the first setting current;
- if the battery voltage is equal to or more than the second setting voltage, the voltage control circuit makes the first switch MOS transistor operate in a liner region and the switching control circuit controls the first high-side MOS transistor and the low-side MOS transistor such that the battery voltage becomes the second setting voltage; and
- if the battery current is equal to or less than a preset stop current, the voltage control circuit turns off the first switch MOS transistor to stop charging the battery.

11. The charging control apparatus according to claim 10, wherein, when the output voltage is lower than the battery voltage, the voltage control circuit controls makes the first switch MOS transistor operate in a linear region to supply power from the battery to the system circuit through the first switch MOS transistor.

12. The charging control apparatus according to claim 2, further comprising a second high-side MOS transistor connected between the first end of the low-side MOS transistor and the battery terminal, an operation of the second high-side MOS transistor being controlled by the switching control circuit,
- wherein, when the output voltage is lower than the battery voltage, the switching control circuit turns off the first high-side MOS transistor, and controls the low-side MOS transistor and the second high-side MOS transistor to supply power from the battery to the system circuit through the second high-side MOS transistor.

\* \* \* \* \*